(12) United States Patent
Weyna et al.

(10) Patent No.: US 9,135,834 B2
(45) Date of Patent: Sep. 15, 2015

(54) APPARATUS AND METHOD TO PREVENT SIDE CHANNEL POWER ATTACKS IN ADVANCED ENCRYPTION STANDARD USING FLOATING POINT OPERATION

(71) Applicant: THE GOVERNMENT OF THE UNITED STATES AS REPRESENTED BY THE SECRETARY OF THE AIR FORCE, Washington, DC (US)

(72) Inventors: Lisa Weyna, Manlius, NY (US); John W. Rooks, Rome, NY (US)

(73) Assignee: The United Sates of America as represented by the Secretary of the Air Force, Washington, DC (US)

( * ) Notice: Subject to any disclaimer, the term of this patent is extended or adjusted under 35 U.S.C. 154(b) by 42 days.

(21) Appl. No.: 14/161,780

(22) Filed: Jan. 23, 2014

(65) Prior Publication Data
US 2014/0321639 A1    Oct. 30, 2014

Related U.S. Application Data

(60) Provisional application No. 61/817,374, filed on Apr. 30, 2013.

(51) Int. Cl.
*H04L 9/30* (2006.01)
*G09C 1/00* (2006.01)
*H04L 9/00* (2006.01)
*H04L 9/06* (2006.01)

(52) U.S. Cl.
CPC *G09C 1/00* (2013.01); *H04L 9/003* (2013.01); *H04L 9/0631* (2013.01); *H04L 2209/12* (2013.01)

(58) Field of Classification Search
CPC ..... H04L 2209/24; H04L 9/14; H04L 9/0631; H04L 9/30; H04L 2209/12
See application file for complete search history.

(56) References Cited

U.S. PATENT DOCUMENTS

| 7,512,241 | B2 * | 3/2009 | Vaudenay et al. | 380/277 |
| 7,606,365 | B2 * | 10/2009 | Noh et al. | 380/203 |
| 2003/0223580 | A1 * | 12/2003 | Snell | 380/28 |
| 2005/0089160 | A1 * | 4/2005 | Crispin et al. | 380/28 |
| 2007/0244951 | A1 * | 10/2007 | Gressel et al. | 708/252 |
| 2008/0175381 | A1 * | 7/2008 | Drehmel et al. | 380/252 |
| 2008/0240426 | A1 * | 10/2008 | Gueron et al. | 380/44 |
| 2009/0243028 | A1 * | 10/2009 | Dong et al. | 257/499 |
| 2010/0194205 | A1 * | 8/2010 | Tokunaga et al. | 307/100 |
| 2010/0195820 | A1 * | 8/2010 | Frank | 380/28 |
| 2010/0232602 | A1 * | 9/2010 | Nobukata | 380/28 |
| 2012/0288085 | A1 * | 11/2012 | Li et al. | 380/28 |
| 2013/0346781 | A1 * | 12/2013 | Chung et al. | 713/324 |

OTHER PUBLICATIONS

Gueron, S., Advanced Encryption Standard (AES) Instruction Set, White Paper, Intel Corporation, Apr. 2008.*
Federal Information Processing Standard Publication 197, Announcing the Advanced Encryption Standard (AES), Nov. 26, 2001.*

* cited by examiner

*Primary Examiner* — Yonas Bayou
(74) *Attorney, Agent, or Firm* — Joseph A Mancini

(57) ABSTRACT

Apparatus and method for obscuring round 1 power consumption of hardware implementation of the AES algorithm. By simultaneously executing a processor floating point operation while executing round 1 of the AES algorithm power consumption of the AddRoundKey transformation is obscured. This prevents the opportunity to determine the AES key value during a side channel power attack.

2 Claims, 6 Drawing Sheets

US 9,135,834 B2

APPARATUS AND METHOD TO PREVENT SIDE CHANNEL POWER ATTACKS IN ADVANCED ENCRYPTION STANDARD USING FLOATING POINT OPERATION

PRIORITY CLAIM UNDER 35 U.S.C. §119(e)

This patent application claims the priority benefit of the filing date of provisional application Ser. No. 61/817,374, having been filed in the United States Patent and Trademark Office on Apr. 30, 2013 and now incorporated by reference herein.

STATEMENT OF GOVERNMENT INTEREST

The invention described herein may be manufactured and used by or for the Government for governmental purposes without the payment of any royalty thereon.

BACKGROUND OF INVENTION

This invention relates to the Advanced Encryption Standard (AES) outlined in the Federal Information Processing Standards (FIPS) Publication 197. The AES standard defines the FIPS-approved algorithm that is used to encrypt and decrypt 128 bits of data using a 128, 192, or 256 bit key. When you encrypt (encipher) data the output is called ciphertext and when you decrypt (decipher) the ciphertext the output is called plaintext.

The AES algorithm executes a number of rounds that is dependent on the key size. For 128 bit key 11 rounds are executed, for 192 bit key 13 rounds are executed, and for a 256 bit key 15 rounds are executed. Referring to FIG. 1, the AES algorithm for encryption consists of four transformations: AddRoundKey 100; SubBytes 101; ShiftRows 102; and MixColumns 103.

Referring to FIG. 2, the AES algorithm for decryption consists of four transformations: AddRoundKey 100; InvShiftRows 201; InvSubBytes 202; and InvMixColumns 203. The AES algorithm also defines a method of key expansion that creates a round key for each round execution of the algorithm. These round keys are utilized in the AddRoundKey 100 transformation.

The AddRoundKey 100 transformation is specified as a simple bitwise exclusive or operation executed on the plaintext (encryption)/ciphertext (decryption) and round key. Referring to FIG. 3 schematically depicts the transformation. Each data bit 300 and each round key bit 301 are combined in exclusive OR 302 and stored in flip flop (or latch) 303, for all 128 data bits. Round 1 of the AES algorithm only executes the AddRoundKey 100 transformation, while all remaining rounds execute multiple transformations. This leaves round 1 vulnerable to side channel power attacks.

OBJECTS AND SUMMARY OF THE INVENTION

An object of the present invention is to provide an apparatus and method to prevent side channel power attacks from determining the key when the AES algorithm is implemented in hardware.

Another object of the present invention is to provide a method and apparatus to foreclose the opportunity to measure and detect the power consumed during round 1 of the AES encryption process.

Yet another object of the present invention is to provide a method and apparatus to prevent determination of an AES key value.

Briefly stated, the present invention provides an apparatus and method for obscuring round 1 power consumption of hardware implementation of the AES algorithm. By simultaneously executing a processor floating point operation while executing round 1 of the AES algorithm power consumption of the AddRoundKey transformation is obscured. This prevents the opportunity to determine the AES key value during a side channel power attack.

In an embodiment of the present invention, an apparatus is provided which acts on each pair of said data bits and said key bits for preventing the determination of the encryption key. The apparatus comprises a first circuit acting on each pair of data bits and key bits, where the first circuit has a first flip flop circuit having a signal input, a clock input, and a latched output; a second flip flop circuit having a signal input, a clock input, and a latched output; an exclusive OR (XOR) circuit having a first input, a second input, and an exclusive OR (XOR) output; a third flip flop circuit having a signal input, a clock input and a latched output. The apparatus further comprises a second circuit acting on each said data bit where the second circuit has a floating point processor circuit having an input corresponding to each data bit, and an output; and a fourth flip flop circuit having a signal input, a clock input, and a latched output; where a latched version of the key bit is connected to the first input of the exclusive OR (XOR) circuit; a latched version of the data bit is connected to the second input of the exclusive OR (XOR) circuit; the exclusive OR (XOR) output is connected to the signal input of the third flip flop circuit; the data bit is connected to the corresponding floating processor circuit input; and the output of the floating processor circuit is connected to the signal input of the fourth flip flop circuit.

In another embodiment of the present invention, a method for preventing the determination of an encryption key in the Advanced Encryption Standard, the following steps are performed on each pair of data bits and key bits in the encryption key. The data bit and key bit are latched, then exclusively ORed (XOR) together, with the output of the XOR operation being again latched. Simultaneously, a floating point operation is performed on each latched data bit, with the output of floating point operation being latched.

DETAILED DESCRIPTION OF THE PREFERRED EMBODIMENT

Figure 1:
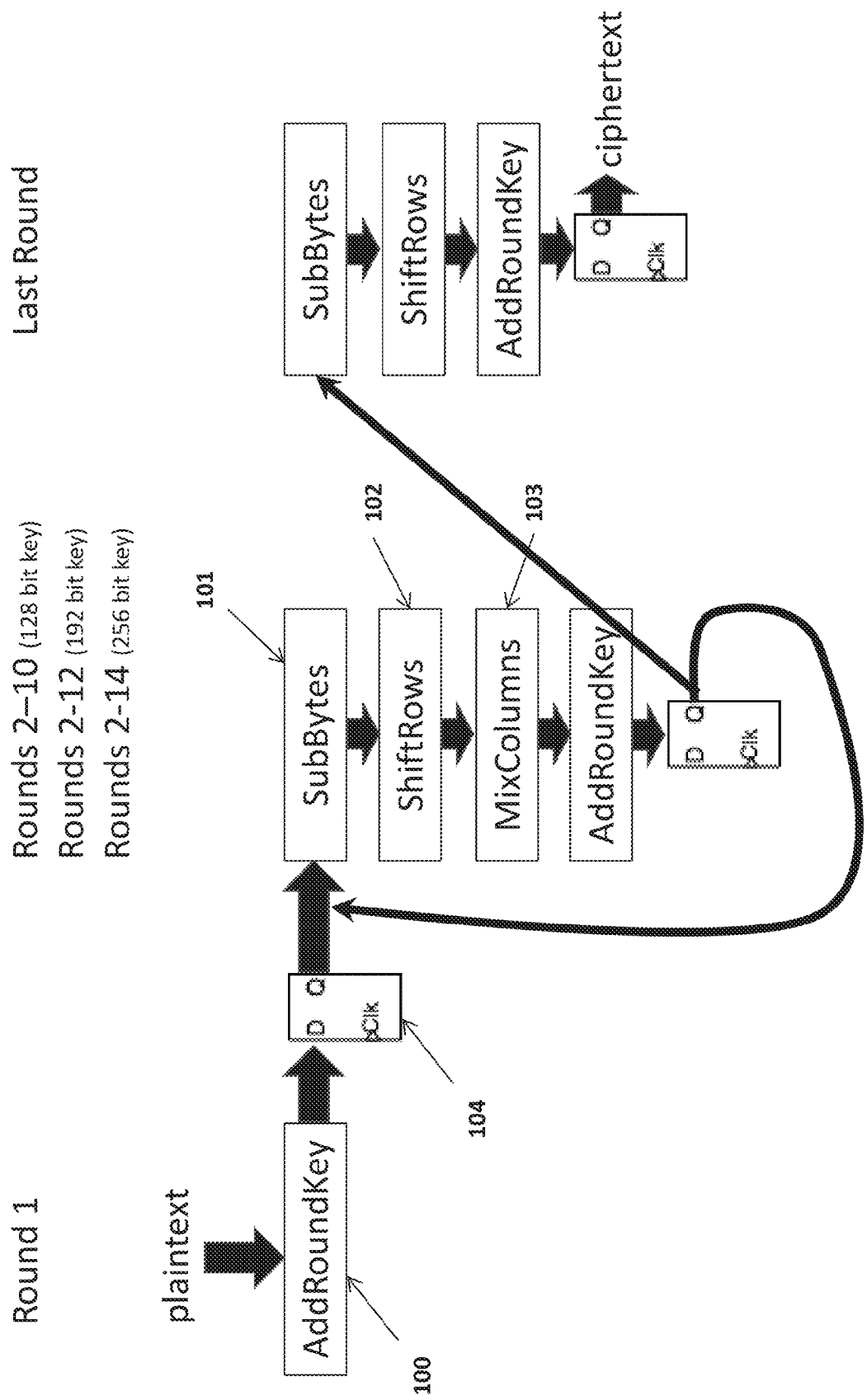
FIG. 1 is a functional diagram of the AES encryption algorithm.
Figure 2:
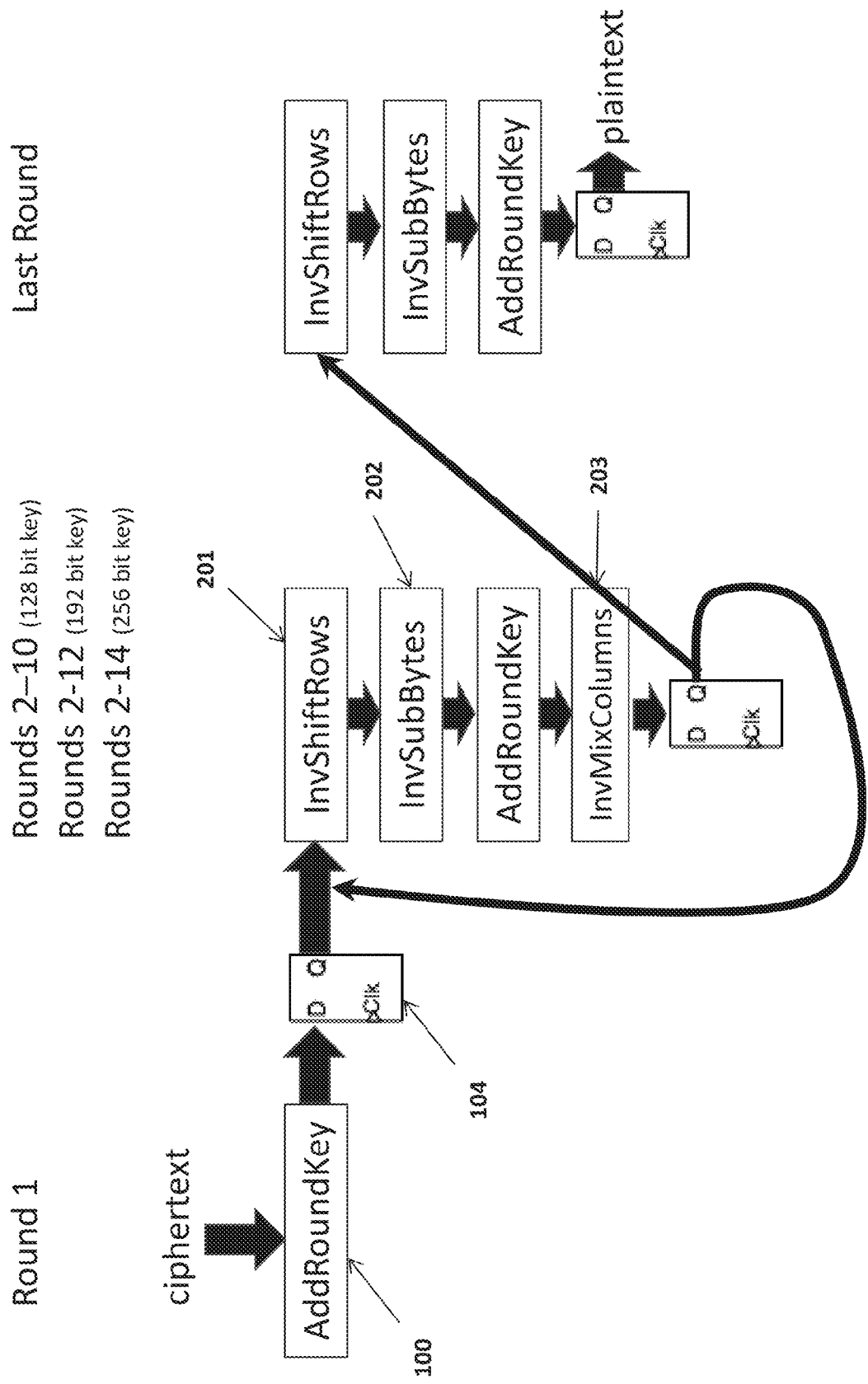
FIG. 2 is a functional diagram of the AES decryption algorithm.
Figure 3:
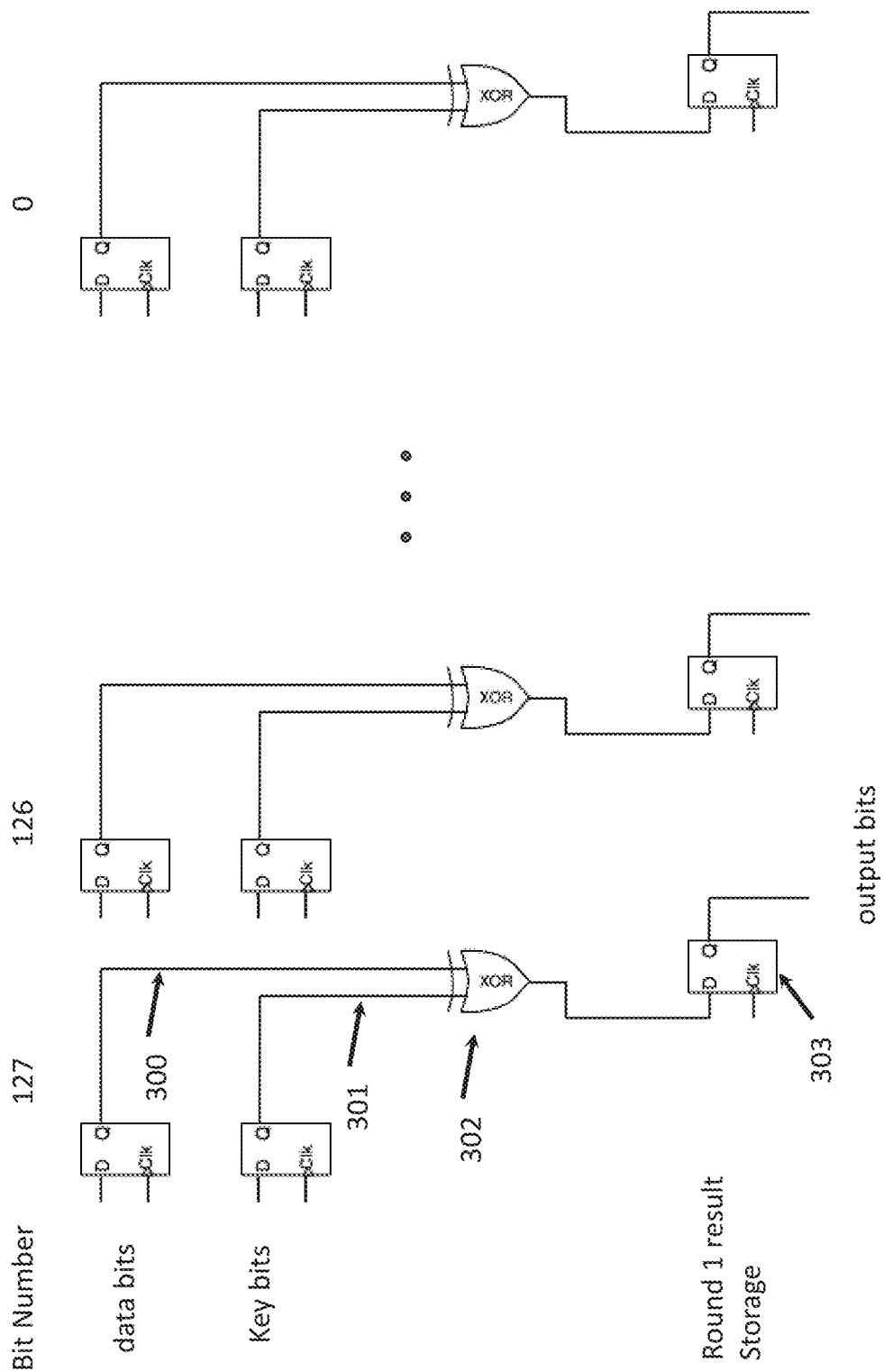
FIG. 3 is a schematic representation of the AddRoundKey transformation of the AES algorithm.

Referring to FIG. 1, round 1 as specified by the algorithm leaves the key vulnerable to side channel power attacks when the algorithm is implemented in hardware. Round 1 only executes the AddRoundKey 100 transformation, or an exclusive or operation of the and data (see FIG. 3). In order to obfuscate the power consumption during round 1 execution, the present invention also uses the plaintext data input as an input to a processor floating point unit.

Figure 4:
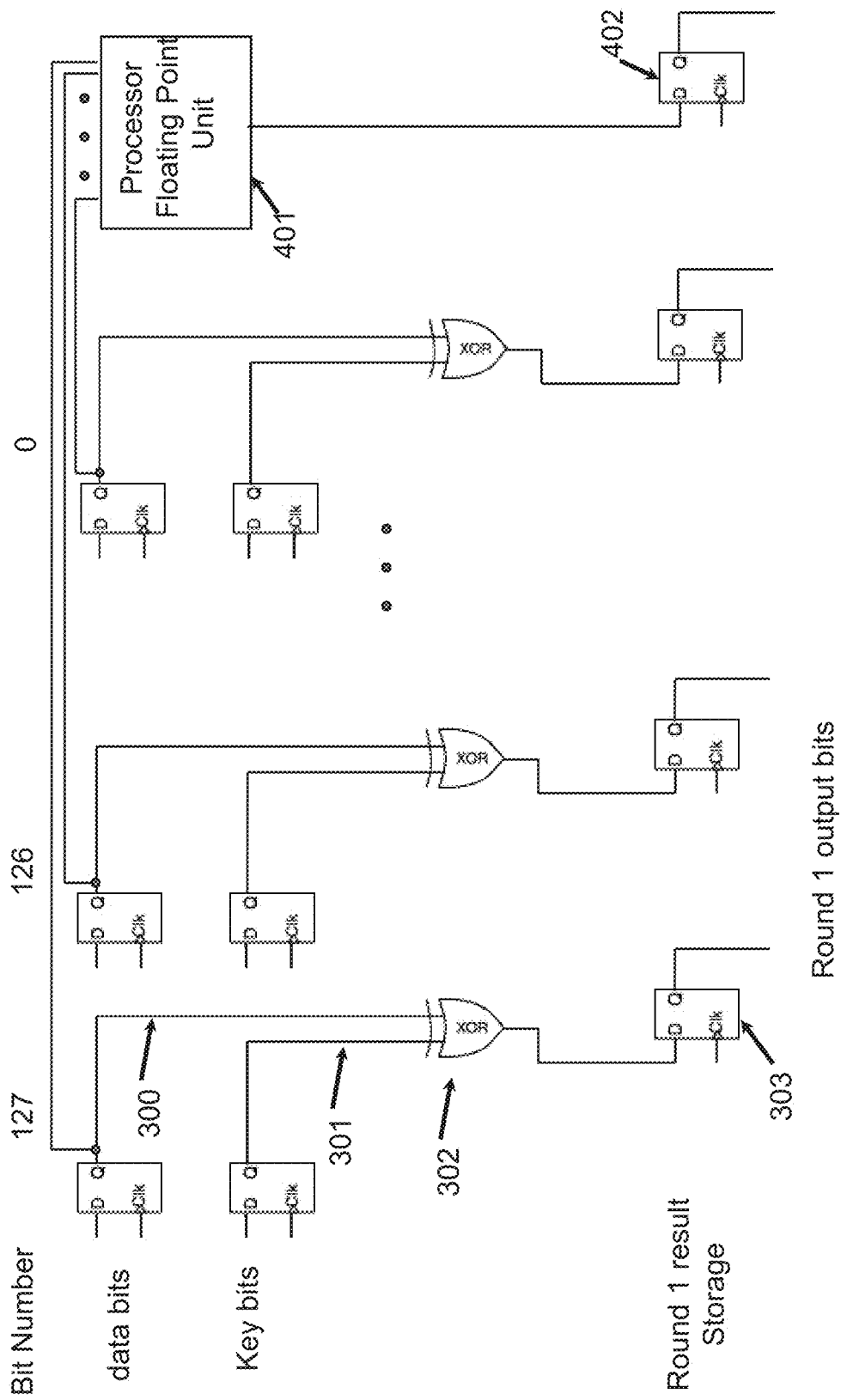
FIG. 4 is a schematic diagram of the AES encryption algorithm with the present invention included.

Referring to FIG. 4, the present invention's physical implementation in the Advanced Encryption Standard (AES) process is schematically depicted. The plaintext data is not only input to the AddRoundKey 100 transformation but is also simultaneously used as input to a processor floating point unit 401 and latched in flip flop 402. The floating point operation obfuscate the power consumption of the AddRoundKey 100 due to the new plurality of lower level gates that will be exercised during the floating point unit operation. The present invention is intended to conduct this operation on all 128 bits of the plain text.

Figure 5:
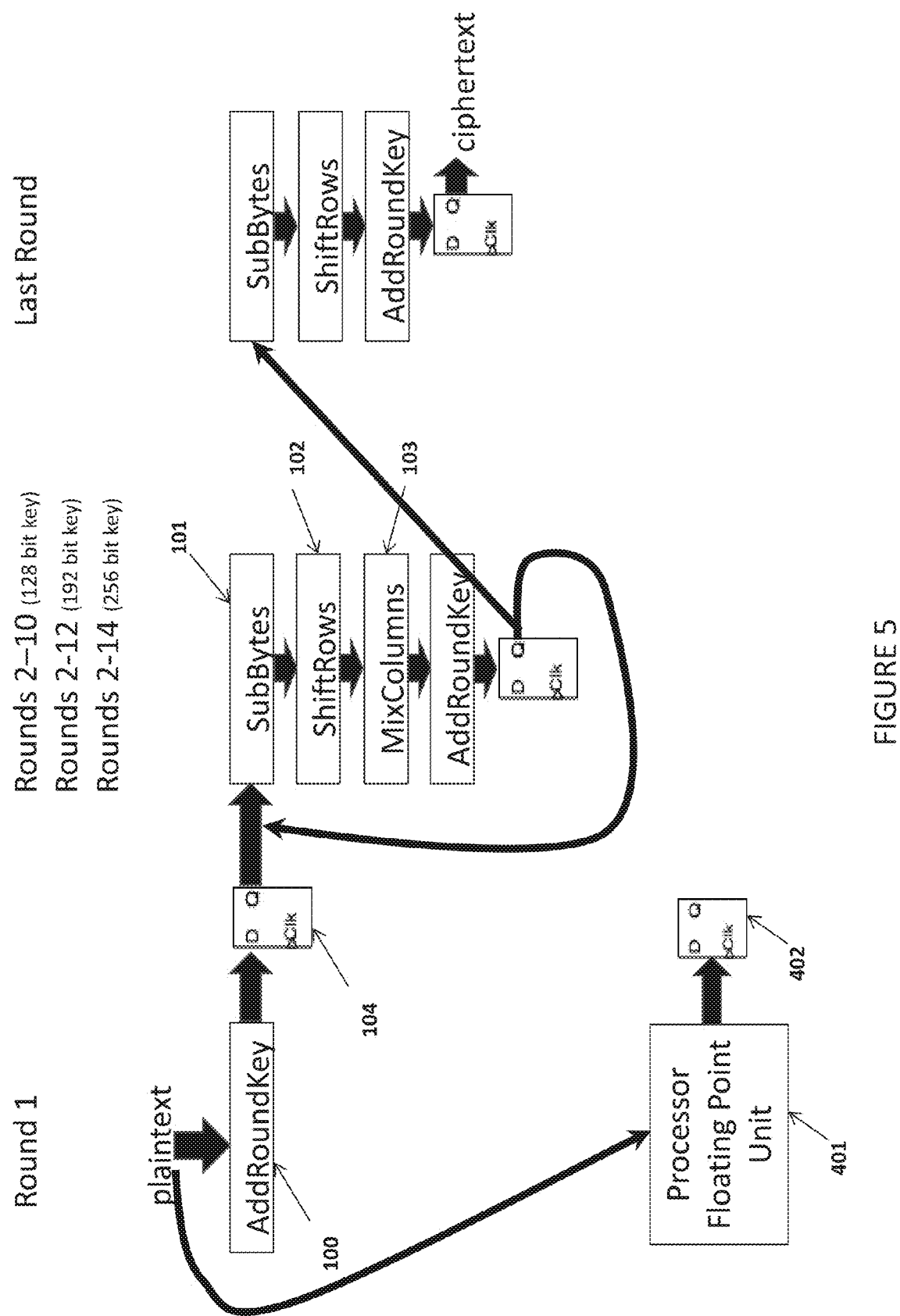
FIG. 5 is a functional diagram of the AES encryption algorithm with the present invention included.
Figure 6:
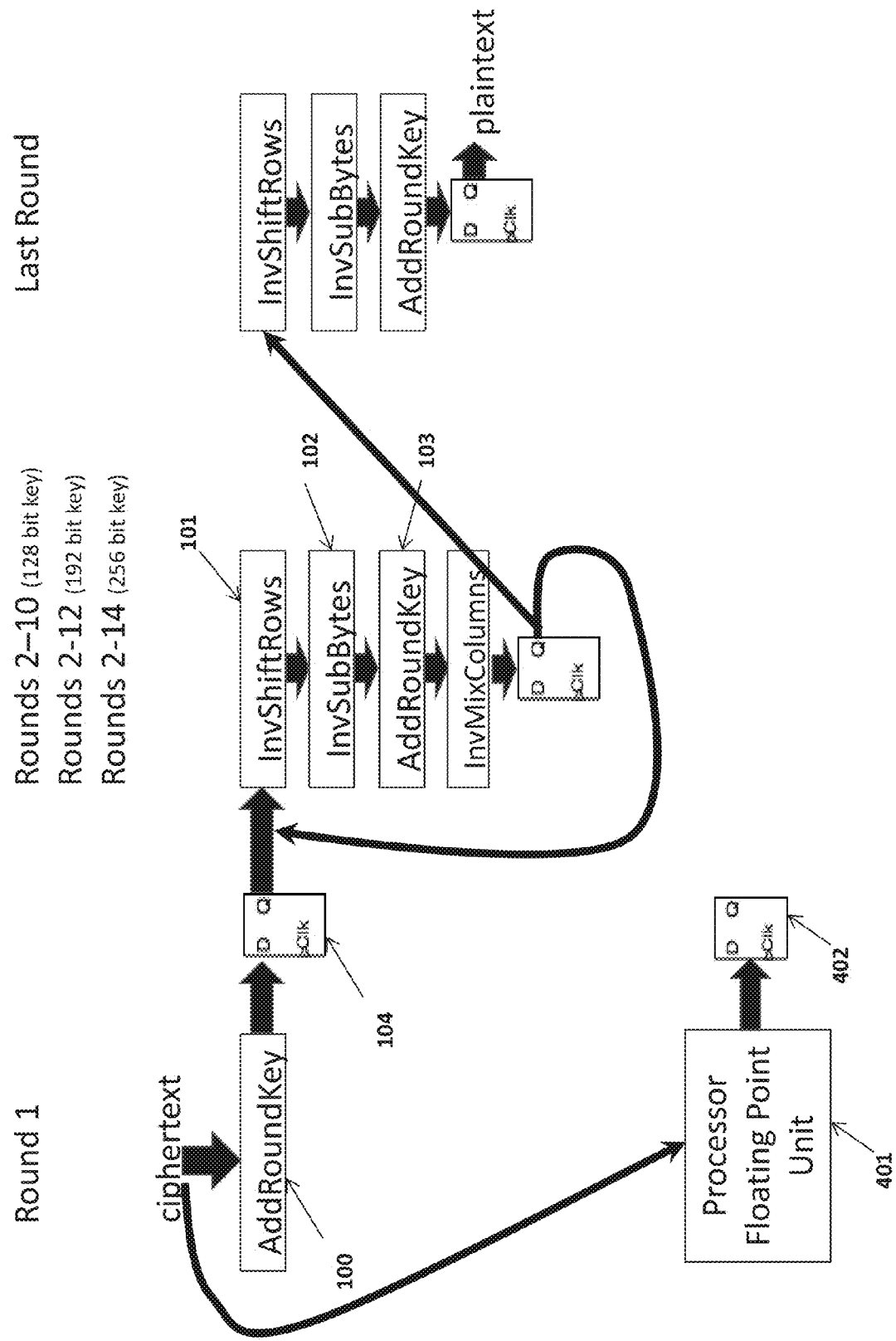
FIG. 6 is a functional diagram of the AES decryption algorithm with the present invention included.

Referring to FIG. 5 and FIG. 6 functionally depict the present invention's placement in the AES encryption and decryption processes, respectively.

What is claimed is:

1. In a hardware implementation of the Advanced Encryption Standard having a data bit and a key bit for each bit of an encryption key, an apparatus which acts on each pair of said data bits and said key bits for preventing the determination of said encryption key, comprising:
   a first circuit acting on each said pair of data bits and key bits, said first circuit further comprising:
   a first flip flop circuit having a signal input, a clock input, and a latched output;
   a second flip flop circuit having a signal input, a clock input, and a latched output;
   an exclusive OR circuit having a first input, a second input, and an exclusive OR output;
   a third flip flop circuit having a signal input, a clock input, and a latched output; and
   a second circuit acting on each said data bit, said second circuit further comprising:
   power obfuscation circuit having an input corresponding to each said data bit, and an output, wherein said power obfuscation circuit is a floating point processor circuit; and
   a fourth flip flop circuit having a signal input, a clock input, and a latched output;
   wherein
   a latched version of said key bit is connected to said first input of said exclusive OR circuit;
   a latched version of said data bit is connected to said second input of said exclusive OR circuit;
   said exclusive OR output is connected to said signal input of said third flip flop circuit;
   said data bit is connected to said corresponding power obfuscation circuit input; and
   said output of said power obfuscation circuit being connected to said signal input of said fourth flip flop circuit.

2. A method for preventing the determination of an encryption key in the Advanced Encryption Standard, said standard having a data bit and a key bit for each bit of an encryption key, comprising the following steps being perforated on each pair of said data bits and said key bits in said encryption key;
   latching said data bit and said key bit;
   exclusively ( )Ring said latched data bit and said key bit;
   latching said exclusively ORed data bit and key bit;
   performing a power obfuscation operation on each said latched data bit, wherein said power obfuscation operation is a floating point operation; and
   latching the output of said power obfuscation operation.

\* \* \* \* \*